United States Patent [19]

Byron et al.

[11] Patent Number: 4,863,231

[45] Date of Patent: Sep. 5, 1989

[54] ACTIVE OPTICAL FIBRE STAR COUPLER

[75] Inventors: Kevin C. Byron, Bishop's Stortford; Terry Bricheno, Great Sampford; Alan Fielding, Sawbridgeworth; Nicholas J. Pitt, Harlow; Robert A. Baker, London, all of Great Britain

[73] Assignee: STC PLC, London, England

[21] Appl. No.: 315,853

[22] Filed: Feb. 27, 1989

[30] Foreign Application Priority Data

May 14, 1988 [GB] United Kingdom ............... 8811490

[51] Int. Cl.$^4$ ............................................. G02B 5/14
[52] U.S. Cl. ..................................... 350/96.16; 330/4; 455/617
[58] Field of Search ............... 350/96.15, 96.16, 96.20; 455/612, 617; 330/4, 4.3, 5; 372/6, 94

[56] References Cited

U.S. PATENT DOCUMENTS

| | | |
|---|---|---|
| 4,220,396 | 9/1980 | Antell ........................ 350/96.16 X |
| 4,473,270 | 9/1984 | Shaw ............................... 350/96.15 |
| 4,515,431 | 5/1985 | Shaw et al. ..................... 350/96.15 |
| 4,546,476 | 10/1985 | Shaw et al. ............................ 372/6 |
| 4,553,238 | 11/1985 | Shaw et al. ............................ 372/6 |
| 4,560,246 | 12/1985 | Cotter ............................. 350/96.16 |
| 4,674,830 | 6/1987 | Shaw et al. ..................... 350/96.15 |
| 4,723,824 | 2/1988 | Shaw et al. ..................... 350/96.15 |
| 4,801,185 | 1/1989 | Bricheno ......................... 350/96.15 |
| 4,817,207 | 3/1989 | Smith et al. ........................ 455/617 |

FOREIGN PATENT DOCUMENTS 2150703 7/1985 United Kingdom ............. 350/96.15

Primary Examiner—William L. Sikes
Assistant Examiner—Akm E. Ullah
Attorney, Agent, or Firm—Lee & Smith

[57] ABSTRACT

An active optical fibre star coupler having a length of amplifying optical fibre (1) optically connected at one end to a wavelength combining coupler (2) and at the other end to via a beam expanding element (3) to a set of output optical fibres.

3 Claims, 1 Drawing Sheet

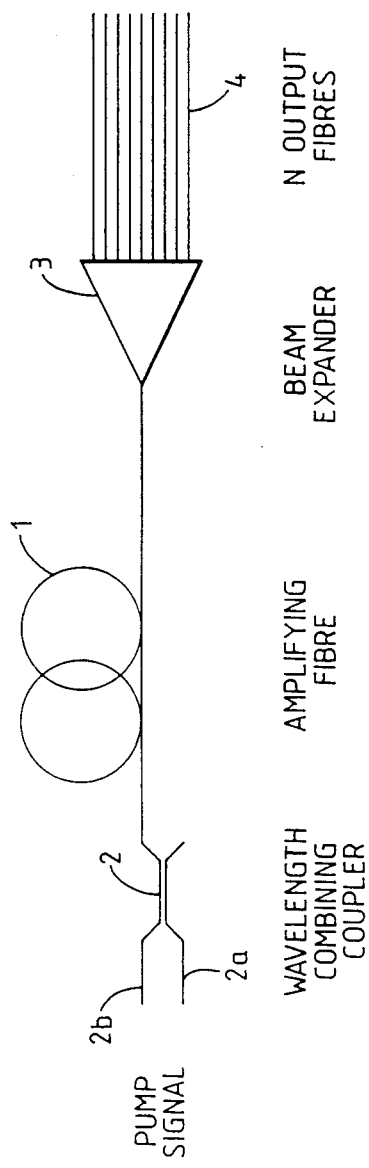

ACTIVE OPTICAL FIBRE STAR COUPLER

BACKGROUND TO THE INVENTION

This invention relates to optical fibre star couplers.

In a conventional star coupler the power in a signal applied to the coupler via a single optical fibre is shared substantially equally between the members of a set of output fibres, this sharing being effected by means of a mixer element interposed optically between the input and output fibres. In a "transmissive" type star coupler one or more input fibres are terminated butted against one end of the mixer element while the set of output fibres have their ends butted against the other end of the mixer element. In a "reflective" type of star coupler all the fibres, both input and output, terminate butted against one end of the mixer element whose opposite end is designed to be totally reflecting. Thus in the transmissive type star coupler optical power input to the coupler on any single one of a first set of (input) fibres is shared substantially equally between the members of a second set of (output) fibres, whereas in the reflective type of coupler optical power input to the coupler on any one of a set of fibres is shared substantially equally between all members of that same set of fibres.

When star couplers are used in large networks that require the input signal to be shared by the coupler between a large number of output fibres it is evident that the amount of power available for any single output fibre is going to be very low if the input signal power is not going to be correspondingly very high. The use of very high power optical transmitters is however undesirable because it presents a potential optical safety hazard should connectors in the optical path between the source and the star coupler become uncoupled.

BRIEF SUMMARY OF INVENTION

According to the present invention there is provided an active optical fibre star coupler having a length of amplifying optical fibre optically connected at one end to a wavelength combining coupler and at the other end via a beam expanding element to a set of output optical fibres.

The wavelength combining coupler enables an optical signal to be coupled into the length of amplifying fibre together with optical pumping power from a local source.

BRIEF DESCRIPTION OF DRAWING

Embodiments of the invention will now be described with reference to the accompanying drawing which illustrates in diagrammatic form an active optical fibre star coupler.

DETAILED DESCRIPTION OF INVENTION

The 1×N active optical fibre star coupler illustrated comprises a length 1 of amplifying optical fibre to one end of which is optically connected a wavelength combining coupler 2. Typically such a coupler may be of the fused fibre type, one example of which is disclosed in our British patent No. 2150703B. The other end of fibre 1 is optically connected to a beam expanding element 3, e.g. a short length of optical preform which is tapered so that at its narrow end it is dimensionally equivalent to a single fibre and can be connected to the fibre 1. At its other, wide end the tapered preform can be butt connected to a set of N fibres 4.

An input signal is coupled into one input port 2a of the coupler 2 and an optical pump, e.g. from a laser (not shown) is coupled into the other input port 2b of the coupler 2. The combined optical power is launched into the amplifying fibre 1 which increases the signal power delivered to the beam expanding element 3 to be shared between the N ouput fibres. The amplifying fibre is typically a neodymium doped cladded glass fibre. To minimise the packing fraction loss in the connection between element 3 and the set of fibres 4 the ouput fibres 4 can be tapered at their ends. The whole assembly of fibre 1, coupler 2 and element 3 can be fused or cemented together to avoid airgaps and/or reflections. Likewise the set of output fibres 4 can be cemented to the element 3.

We claim:

1. An active optical fibre star coupler having a length of amplifying optical fibre optically connected at one end to a wavelength combining coupler and at the other end via a beam expanding element to a set of output optical fibres.

2. An active optical fibre star coupler according to claim 1 wherein the beam expanding element is a length of tapered optical preform.

3. An active optical fibre star coupler according to claim 2 wherein the wavelength combining coupler is a fused fibre coupler.

* * * * *